UNITED STATES PATENT OFFICE.

HERMAN L. HARTENSTEIN, OF CONSTANTINE, MICHIGAN, ASSIGNOR, BY MESNE ASSIGNMENTS, TO CONTINENTAL INVESTMENT COMPANY, OF DULUTH, MINNESOTA, A CORPORATION OF MINNESOTA.

METHOD OF MANUFACTURING CARBID.

946,497.  Specification of Letters Patent.  Patented Jan. 11, 1910.

No Drawing.  Application filed February 18, 1907.  Serial No. 358,013.

*To all whom it may concern:*

Be it known that I, HERMAN L. HARTENSTEIN, a citizen of the United States, residing at Constantine, in the county of St. Joseph and State of Michigan, has invented certain new and useful Improvements in the Method of Manufacturing Carbid, of which the following is a full, clear, and exact specification.

This invention relates to methods for the manufacture of carbid and to products of the same; and it comprises a method of treating molten carbid by subdividing a mass of such carbid in a molten state into relatively small, quickly cooling bodies of dense homogeneous character, such bodies, being subsequently united into an open aggregate by being brought into mutual contact prior to chilling to a degree sufficient to lose their surface viscosity; and it also comprises carbid in the form of an aggregated mass of relatively small, dense, homogeneous bodies, each possessing the properties of a drop of matter solidified from the molten state, such bodies being autogenously united on their meeting surfaces to form an open-textured or honeycombed integral mass, all as more fully hereinafter set forth and claimed.

As it comes on the market, calcium carbid is usually in the form of flinty or hard small lumps or pieces; a form demanded by the conditions in the acetylene generator. In the decomposition of a lump of carbid by water, a layer of hydrated lime is formed around it and in the intermittent operation of the usual types of generators, this lime is often allowed opportunity to crystallize, set and harden. With a large lump, this layer of lime becomes too thick to permit a rapid penetration of water therethrough and the generation of gas becomes irregular after a time. With fine or dustlike carbid on the other hand, the attack of the water is very rapid and the evolution of the gas too tumultuous while the evolved gas is apt to buoy up the small particles and cause them to float, disturbing the normal action of the machine. Fine or dustlike carbid is therefore not salable. The market demands a granular carbid with lumps between certain sizes.

In manufacturing calcium carbid, the molten carbid is usually allowed to cool and solidify in relatively large masses, either in the furnace in which it is produced or in special ingot molds, and these large masses are then crushed or broken to produce the granular carbid of the trade. Carbid being a relatively poor conductor of heat, the exterior of the molten mass sets or hardens while the interior is still fluid or plastic with the production of central piping, cavities, etc., as well as of internal stresses or strains. Opportunity for crystallization and segregation is also afforded and the product usually exhibits a crystalline texture and is of different character in different part of the mass. Ordinarily, the exterior portions are harder and poorer in gas-yielding qualitites than the interior portions, a fact probaly due to segregation phenomena. In crushing the carbid to produce the granulated material, there is always a large proportion of fines or dust-like material; and these fines are commerically worthless while without special expedients they cannot again be converted into high-quality block carbid by remelting. Of the fines, a relatively large proportion comes from the relatively rich, relatively soft interior portions of the carbid block while a relatively large proportion of the merchantable granulated material comes from the harder, poorer exterior.

In the present invention, the stated disadvantages have been obviated by producing the carbid in a new physical form. In lieu of producing a granulated carbid as fractured irregular-shaped fragments of a larger mass of slowly cooled, crystallized and segregated block, body or ingot, the carbid is produced as a multiplicity of separately and relatively quickly cooled, hard, dense, non-segregated bodies of a non-crystalline or cryptocrystalline texture, each such bodies possessing the properties of a drop of matter solidified from the molten state and, if desired, being of uniform dimensions and shape. In accomplishing these results, in lieu of allowing a large body of molten carbid to cool slowly, the molten carbid is disintegrated while still in the fluid form to produce aerially suspended drops, threads, sheets, shreds or the like, these molten bodies being allowed to drop through the air or a suitable gas for a sufficient period of time to insure a cooling sufficient to allow their preserving their discrete form upon collecting in a suitable receptacle without losing their superficial adhesiveness. In the present embodiment of the invention the length of drop or time of suspension is so adjusted that while particles of the material cool sufficiently to preserve their shape they are still nevertheless sufficiently hot upon collection as a mass to be still superficially agglutinative or adhesive whereby the meeting surfaces autogenously unite to form an open-textured or honeycombed integral body.

While the cooling may be carried far enough to directly form a loose granular aggregate, in the present embodiment of my invention, I prefer to form the described honeycombed mass of autogenously united particles or bodies, such a honeycombed mass being convenient to handle and well adapted for use in the art. The molten carbid may, for instance, be first converted into shot-form and the shot before cooling sufficiently to lose their plasticity be brought together and united at their proximate surfaces. The product thus obtained will be a porous mass of agglomerated, autogenously united hard granules of carbid, the free surface of each such granule possessing the great density and hardness ("skin tension") of a liquid surface solidified out of contact with solid bodies. This mass on crushing yields granular carbid without any great amount of fines; or if used in the generator as it is, without much reduction in size, it behaves like a body of separate granules, the water penetrating between the united shot-like bodies and acting on their surfaces as if such shot-like bodies were not united. Each individual granule is homogeneous and uniform in quality since the relatively quick cooling gives no opportunity for segregation or crystallization. The formation of distinct crystals in granular carbid is not advantageous for the reason that the presence of crystals is accompanied by lines of cleavage along the crystal planes and aerial moisture enters along these lines and causes the crystals to split apart and produces fines. Such lines of cleavage are also responsible for much of the formation of fines in the crushing of the carbid cooled in the usual way in large blocks. The crystallization also results in differentiation between one portion of the mass and another, and causes different portions of the mass to be of different quality.

The required subdivision of the molten carbid may be accomplished in many ways. One suitable method is to subject a stream of molten carbid to the action of a blast of gas or air, a gas being preferably employed which is low in oxygen and rich in carbon. The effect of the blast is to scatter the molten carbid into drops, shreds or filaments, the particular form depending on the strength of the blast, the temperature of the molten carbid and similar conditions. The size of the individual globules, drops, threads, etc., may be regulated by regulating these conditions. The fluid material dispersed by the blast in the present embodiment of my invention is allowed a sufficient time of cooling prior to settling into a suitable receptacle to cause a solidification or semi-solidification prior to collection. The cooling is so adjusted that while the individual bodies produced retain their shape upon collection, they are nevertheless still hot enough to possess a certain amount of superficial plasticity or adhesiveness so that on coming into contact they will cohere by an autogenous union between meeting surfaces and form open or honeycombed lumps, bodies or masses consisting of individual dense hard particles autogenously united into an integral open or porous aggregate. Where the blast is so adjusted as to produce drops, the individual particles forming the open mass will be shot-like; where threads or filaments are produced the mass will be of a fibrous nature.

Any method of disintegrating the molten mass may be employed in lieu of the described blast. For instance, the molten carbid may be simply allowed to trickle through a perforated screen or sieve, much as in making shot, and allowed to drop through a sufficient space to give solid globules or pasty globules still possessing sufficient agglutinativeness to unite in the described manner. The screen or sieve employed must of course be of material, such as carbon, sufficiently refractory to withstand the high temperatures employed. Or, the molten carbid may be simply allowed to fall over the end of an inclined plate in such a manner as to allow it to scatter and form drops.

The described methods of operation wherein spongy or honeycombed lumps of carbid are produced give a material which may be used in the acetylene generators as such. There being open passages through the honeycombed lump into which water can penetrate and the united bodies being severally small in dimensions, the size of the lump which is put into the generator is immaterial as regards the regularity of operation since obviously no very thick layer of lime can accumulate opposite any given face of material exposed to the water. If, however, the lumps produced in the described manner are deemed too large, they can of course be reduced to any size desired with a minimum expenditure of power and without the heavy machinery necessary for crushing the dense solid crystalline articles formed in cooling large masses of molten carbid. In such reduction, any ordinary disintegrator may be employed and there is no material production of fines. Other molten carbids produced in the electric furnace which on cooling solidify to hard, dense, stony masses may be advantageously treated in the same manner as calcium carbid under this invention. In treating carbids of this character it is advantageous to employ the process of the present invention and postpone the comminution until after solidification, both for the reason that a better product, free of large crystals and free of segregational differences in character, is obtained and for the reason that labor and machinery are economized.

In the case of calcium carbid, the described method of operation possesses a great additional advantage over the ordinary method of granulating by crushing large bodies of massive carbid in that the individual granules which form the honeycombed mass are more permanent. Crushed massive carbid of course breaks into angular, sharp-edged pieces, these pieces, in the case of carbid possessing a pronounced crystal structure, since the mass breaks in lines corresponding more or less to the cleavage planes of the crystals, and the surface of each angular piece is relatively great as compared with its volume while such surface is readily attackable by contact with the air. And such pieces having been produced by crushing, are fractured, cracked, and shattered, so that air and moisture can readily penetrate and break them down while in the generator they are apt to crumble down prematurely. On the other hand, the individual bodies or granules formed under the present invention are not at any time subjected to cracking strains and their surfaces are rounded and possess the peculiar hardness and density of liquid surfaces solidified out of contact with solids. The free surface of any liquid by virtue of "surface tension" phenomena behaves as if formed of an actual tough skin and on solidifying out of contact with solids this "surface tension toughness" is still retained. In the honeycombed structure, the surfaces of the several constituent pieces, where out of contact with each other, retain the hard skin formed in passage through and solidification in the air. And where the pieces are, as is preferable, more or less globular or shot-like in shape, the surface of any such globular body is of course minimal as compared with the volume.

While the period of passage of the dispersed portions of carbid through the air may be sufficiently prolonged to allow complete solidification prior to settling, thereby producing a loose granular aggregate like loose shot, I do not specifically claim this method of operation or the product thereof in this application, such method and product forming the subject matter of my co-pending application Ser. No. 358,012, filed Feb. 18, 1907.

What I claim is:

1. In the manufacture of carbid, the process which comprises disintegrating molten carbid into a multiplicity of aerially suspended particles and collecting such particles subsequent to sufficient cooling and solidification to enable them to retain shape without losing superficial adhesiveness.

2. In the manufacture of calcium carbid, the process which comprises disintegrating molten calcium carbid into a multiplicity of aerially suspended particles and collecting such particles subsequent to sufficient cooling and solidification to enable them to retain shape without losing superficial adhesiveness.

3. In the manufacture of carbid, the process which comprises disintegrating carbid into a multiplicity of relatively small separate particles while such carbid is hot and plastic, allowing the particles to cool sufficiently to enable them to retain their shape without losing their superficial adhesiveness and assembling such particles in an open-textured integral mass.

4. In the manufacture of calcium carbid, the process which comprises disintegrating calcium carbid into a multiplicity of relatively small separate particles while such carbid is hot and plastic, allowing the particles to cool sufficiently to enable them to retain their shape without losing their superficial adhesiveness and assembling such particles in an open-textured integral mass.

5. In the manufacture of carbid, the process which comprises scattering a body of hot and plastic carbid to form aerially suspended particles and collecting such particles to form a cellular mass.

6. In the manufacture of calcium carbid, the process which comprises scattering a body of hot and plastic calcium carbid to form aerially suspended particles and collecting such particles to form a cellular mass.

7. In the manufacture of carbid, the process which comprises scattering a body of molten carbid to form aerially suspended particles and collecting such particles to form a cellular mass.

8. In the manufacture of calcium carbid, the process which comprises scattering a body of molten calcium carbid to form aerially suspended particles and collecting such particles to form a cellular mass.

9. In the manufacture of carbid, the process which comprises producing aerially suspended drops from molten carbid and collecting such drops together as an agglutinated open-textured mass after a sufficient period of cooling to enable a retention of their shape without loss of superficial adhesiveness.

10. In the manufacture of calcium carbid, the process which comprises producing aerially suspended drops from molten calcium carbid and collecting such drops together as an agglutinated open-textured mass after a sufficient period of cooling to enable a retention of their shape without loss of superficial adhesiveness.

11. In the manufacture of calcium carbid, the process which comprises forming calcium carbid while in a molten condition into small particles, allowing these particles to partially solidify individually while separate from one another and finally cementing them together by the adhesiveness of their own surfaces.

12. In the manufacture of calcium carbid, the process which comprises scattering molten calcium carbid to form small particles thereof, allowing these particles to partially solidify out of contact with one another while in space and finally bringing them together again before they entirely lose their plastic consistency.

13. In the manufacture of calcium carbid, the process which comprises forming molten calcium carbid into small particles and allowing these particles to cool out of contact with one another sufficiently to retain their individuality when coming together; and then causing them to adhere together by the adhesiveness to their own surfaces while maintaining spaces between them.

14. As a new article of manufacture, a mass of carbid composed of small individual particles, each such particle possessing the properties of a drop set from the molten state, such particles being autogenously united into an open-textured integral mass.

15. As a new article of manufacture, a mass of calcium carbid composed of small individual particles, each such particle possessing the properties of a drop set from the molten state, such particles being autogenously united into an open-textured integral mass.

16. As a new article of manufacture, fused calcium carbid existing in a porous and honeycombed form.

17. As a new article of manufacture, fused calcium carbid existing in the form of an integral body having pores or passages.

18. As a new article of manufacture, a body of calcium carbid possessing a cellular formation.

19. As a new article of manufacture, a homogeneous and integral body of fused calcium carbid existing in a honeycombed formation.

20. As a new article of manufacture, a body of calcium carbid existing as an aggregation of small bodies or particles autogenously united at meeting surfaces with spaces between said bodies.

In testimony whereof I have signed my name to this specification, in the presence of two subscribing witnesses, on this 16th day of February A. D. 1907.

HERMAN L. HARTENSTEIN.

Witnesses:
FRANCIS A. HOPKINS,
FRANK T. BROWN.